(12) United States Patent
Kuster et al.

(10) Patent No.: US 11,524,916 B2
(45) Date of Patent: *Dec. 13, 2022

(54) METHOD FOR PRODUCING A PRINTED, COATED PANEL

(71) Applicant: SAINT-GOBAIN GLASS FRANCE, Courbevoie (FR)

(72) Inventors: Hans-Werner Kuster, Aachen (DE); Sebastian Janzyk, Herzogenrath (DE); Li-Ya Yeh, Geilenkirchen (DE); Stephane Auvray, Suresnes (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 262 days.

This patent is subject to a terminal disclaimer.

(21) Appl. No.: 16/767,906

(22) PCT Filed: Nov. 9, 2018

(86) PCT No.: PCT/EP2018/080705
§ 371 (c)(1),
(2) Date: May 28, 2020

(87) PCT Pub. No.: WO2019/105713
PCT Pub. Date: Jun. 6, 2019

(65) Prior Publication Data
US 2020/0399953 A1 Dec. 24, 2020

(30) Foreign Application Priority Data
Nov. 30, 2017 (EP) .................................. 17204643

(51) Int. Cl.
*C03B 27/012* (2006.01)
*C03C 17/36* (2006.01)
*C03C 17/38* (2006.01)

(52) U.S. Cl.
CPC .......... *C03B 27/012* (2013.01); *C03C 17/366* (2013.01); *C03C 17/3644* (2013.01);
(Continued)

(58) Field of Classification Search
CPC ................................................ C03C 2218/328
See application file for complete search history.

(56) References Cited

U.S. PATENT DOCUMENTS 5,622,540 A * 4/1997 Stevens ................. C03B 33/091
219/121.6
2004/0086652 A1 5/2004 Degand
(Continued)

FOREIGN PATENT DOCUMENTS

CN 101089482 A 12/2007
CN 103391904 A 11/2013
(Continued)

OTHER PUBLICATIONS

International Search Report as issued in International Patent Application No. PCT/EP2018/080705, dated Jan. 18, 2019.
(Continued)

*Primary Examiner* — Cynthia Szewczyk
(74) *Attorney, Agent, or Firm* — Pillsbury Winthrop Shaw Pittman LLP

(57) ABSTRACT

A method for producing a coated and printed glass panel, includes a) providing a glass substrate having a metal-containing coating on a first surface and a polymeric protective layer with a thickness d arranged on this metal-containing coating, b) removing the polymeric protective layer in a first region using a carbon dioxide laser, c) removing the metal-containing coating within the first region only in a second region using a solid-state laser such that an edge region is created, in which the metal-containing coating is intact and in which the polymeric protective layer (Continued)

was removed in step b), d) applying a ceramic ink only in the first region, e) heat treating the glass panel at >600° C., wherein the polymeric protective layer is removed on the entire first surface, in the edge region, the metal-containing coating is dissolved by the ceramic ink lying above it, and the ceramic ink is fired.

18 Claims, 3 Drawing Sheets

(52) U.S. Cl.
CPC .......... *C03C 17/3681* (2013.01); *C03C 17/38* (2013.01); *C03C 2217/213* (2013.01); *C03C 2217/78* (2013.01); *C03C 2218/118* (2013.01); *C03C 2218/119* (2013.01); *C03C 2218/31* (2013.01); *C03C 2218/328* (2013.01); *C03C 2218/355* (2013.01)

(56) References Cited

U.S. PATENT DOCUMENTS

| | | |
|---|---|---|
| 2006/0257670 A1 | 11/2006 | Brochot et al. |
| 2011/0027554 A1 | 2/2011 | Gouardes et al. |
| 2011/0233481 A1 | 9/2011 | Alvarez |
| 2016/0169531 A1 | 6/2016 | Wagner et al. |
| 2016/0194516 A1 | 7/2016 | Nadaud et al. |

FOREIGN PATENT DOCUMENTS

| | | | | |
|---|---|---|---|---|
| CN | 104159699 A | | 11/2014 | |
| CN | 105431391 A | | 3/2016 | |
| CN | 105693109 A | | 6/2016 | |
| CN | 106458692 A | | 2/2017 | |
| DE | 10 2014 112822 A1 | | 3/2016 | |
| JP | 05310442 A | * | 11/1993 | ............. C03C 17/06 |
| JP | 2003245784 A | * | 9/2003 | ......... B23K 26/0624 |
| WO | WO 2012/132935 A1 | | 10/2012 | |
| WO | WO-2014033007 A1 | * | 3/2014 | ......... B23K 26/0006 |
| WO | WO 2014/133929 A2 | | 9/2014 | |
| WO | WO 2015/019022 A1 | | 2/2015 | |

OTHER PUBLICATIONS

Examination Report as issued in Indian Patent Application No. 202017014646, dated Sep. 18, 2020.
Preliminary Office Action as issued in Brazilian Patent Application No. BR112020007193-5, dated May 4, 2022.
First Office Action as issued in Chinese Patent Application No. 201880074161.1, dated Nov. 26, 2021.

* cited by examiner

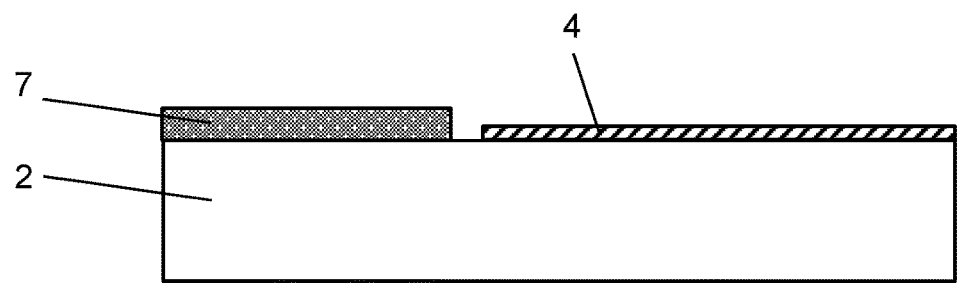
Fig. 4a)
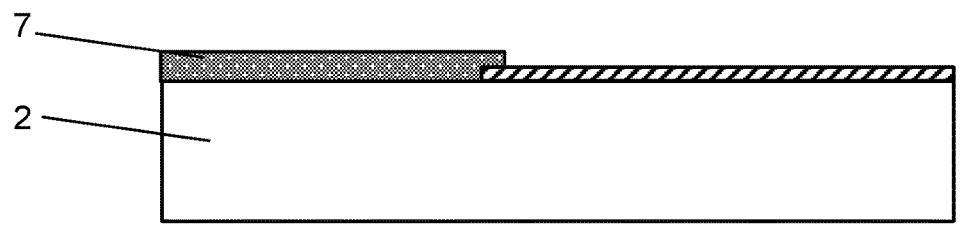
Fig. 4b)
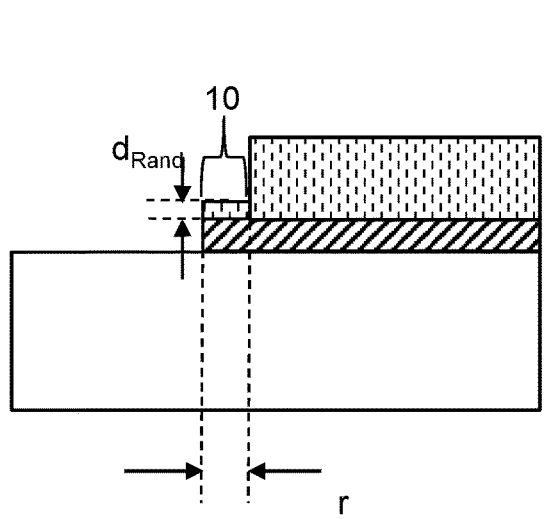 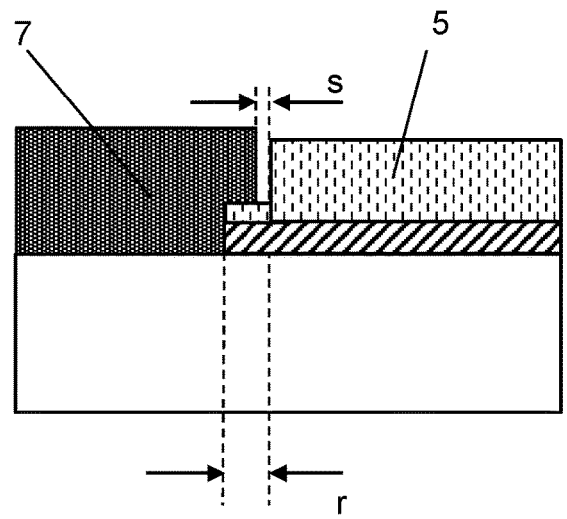
Fig. 5a)  Fig. 5b)

METHOD FOR PRODUCING A PRINTED, COATED PANEL

CROSS-REFERENCE TO RELATED APPLICATIONS

This application is the U.S. National Stage of PCT/EP2018/080705, filed Nov. 9, 2018, which in turn claims priority to European patent application number 17 204 643.5 filed Nov. 30, 2017. The content of these applications are incorporated herein by reference in their entireties.

The invention relates to a method for producing a printed, coated glass panel; a printed, coated panel; and use thereof.

Currently, glass is becoming increasingly important as a building material. Architects sometimes design complete façades made of glass elements. In order to realize buildings that are not only of high quality aesthetically but also, at the same time, energy-efficient, coated glass substrates that, for example, reduce solar radiation and thus lower costs for air conditioning are used.

Many different coatings are known. There are, for example, glasses with antireflective coatings, thermally improving coatings (low-E, solar protection), or heatable layers. Many of these coatings are not very stable mechanically and are, in particular, scratch-sensitive and corrosion-susceptible. In particular, silver-based layers are very sensitive in this regard.

During production of such glass elements for the architectural sector, the glass substrates pass through various process steps. Usually, a coating that consists, in many cases, of multiple thin layers is applied on a mostly clear float glass. After coating, the glass must also pass through a toughening process. For this, it is exposed to temperatures above 600° C. However, this toughening process does not always take place immediately. The coated glass must, consequently, be storable for a few weeks to months and must also be able to withstand transport to a different processing site.

There are various approaches to protecting the coated glass. One variant is a peelable film that protects the coating during storage and that can be peeled off before toughening. Another solution is a polymeric protective layer that can be washed off with water, as is described in DE102014112822A1. A further solution is a polymeric protective layer that is removed without residue during toughening at the high temperatures present then. The last solution is described in US2016194516A1.

In the building glass sector, increasingly frequently panels with imprints of various types are used. For example, glasses with black prints in the edge region that conceal fastening elements or sensors are increasingly used. The ink is typically a ceramic ink, which is fired for fixing during the toughening process. The combination of an imprint with a coating is a challenge. In the case of direct printing on a metal-containing coating, there are, namely, disturbing optical effects after firing.

WO2014/133929 describes a method in which an ink is used directly on metal-containing coating. A disadvantage of this method is that this ink cannot be used directly on a polymeric protective layer that protects the metal-containing coating. The metal-containing coating would then be unprotected during storage and transport to the printer, often situated at a different production site or in a different operation from the coating equipment.

When the polymeric protective layer is to be combined with a printing operation, the polymeric protective layer and the metal-containing coating must be removed in the region to be printed. One possibility is mechanical removal of the protective layer and the metal-containing coating. The printing can then be carried out in the de-coated region, while, at the same time, the metal-containing coating continues to be protected by a polymeric protective layer in the remaining region. However, during mechanical removal of the coating with a suitable grinding wheel, small scratches and damage occur in the de-coated region. In particular, after the toughening process, these are clearly visible despite the printing and mar the optical appearance. Abrasive removal is also not always residue free.

A further problem with this method is that exact positioning of the print at the edge of the coated region is necessary. Otherwise, optical errors develop at the boundary between the print and the coating: If the print is too far from the coating, this creates an area without coating that appears lighter than the rest of the panel (cf. FIG. 4a). If the print is applied over the metal-containing coating, there are optical defects in the printed region (cf. FIG. 4b). Mechanical removal does not provide an adequately sharp boundary line between the de-coated and the coated region. Subsequent exact alignment of the printing at this edge is therefore too imprecise and the above-described optical defects occur.

The object of the present invention is to provide an improved method for producing a coated and printed glass panel.

The object is accomplished according to the invention by a method in accordance with the independent claim 1. Preferred embodiments are apparent from the dependent claims.

The method for producing a coated and printed glass panel comprises at least the following steps, in the order indicated:
a) Providing a glass substrate having a metal-containing coating on at least one first surface and a polymeric protective layer with a thickness d arranged on this metal-containing coating,
b) Removing the polymeric protective layer in a first region using a carbon dioxide laser,
c) Removing the metal-containing coating within the first region only in a second region using a solid-state laser such that an edge region is created, in which the metal-containing coating is intact and in which the polymeric protective layer was removed in step b),
d) Applying a ceramic ink in the first region,
e) Temperature treatment of the glass panel at >600° C., wherein
the polymeric protective layer is removed on the entire first surface,
in the edge region, the metal-containing coating is dissolved by the ceramic ink lying above it, and
the ceramic ink is fired.

After step c), the polymeric protective layer and the metal-containing coating outside the first region are still intact. This means that in step b), the polymeric layer outside the first region is not removed. Likewise, in step c), the metal-containing coating outside the first region is not removed. However, after step c), both the polymeric protective layer and the metal-containing coating are removed in the entire second region. The metal-containing coating is still intact in the edge region, in other words, the metal-containing coating is not removed in the edge region.

In step d), the ceramic ink is applied exclusively in the first region and not in the region provided with the polymeric protective layer. Thus, unsightly results after the firing of the ink are avoided.

In step e), during the temperature treatment, the ceramic ink in the edge region migrates into the metal-containing coating present there and bonds there with the first surface of the glass panel. Thereafter, the metal-containing coating is no longer perceptible as such by the naked eye. The observer sees only the fired ceramic ink, which appears uniform in the entire first region.

The provision, in step a), of a glass substrate, on whose first surface a metal-containing coating was arranged and a polymeric protective layer had been arranged on this metal-containing coating, can be done in the following two steps:
a1) Applying a metal-containing coating on a first surface of a glass substrate, and
a2) Applying a polymeric protective layer on the metal-containing coating.

By using a carbon dioxide laser in step b), it is possible to selectively remove only the polymeric protective layer in a first region. The carbon dioxide laser does not attack the underlying metal-containing coating. The removal of the polymeric protective layer need not be 100%. It is possible for the thickness d to be reduced, for example, only to 10% of the original thickness. This can be readily adapted to the specific application. In the subsequent step c), the possibly remaining polymeric protective layer is automatically removed without residue.

Thanks to the removal of the polymeric protective layer in the first region, the removal of the metal-containing coating in step c) proceeds faster. The metal-containing coating is left in an edge region of the width r. The edge region is the region located inside the first region between the second region and the surrounding region with the existing polymeric protective layer. The edge region is thus the intermediate region between the second region and the region provided with the polymeric protective layer. The edge region thus lies at an edge of the first region. In the following step d), the ceramic ink is applied in the edge region. Printing is done only in the first region such that overprinting of the polymeric protective layer is avoided. In other words, the ceramic ink is applied exclusively in the first region and not in the region with the polymeric protective layer. After the drying of the ink, the glass panel is subjected to a temperature treatment. During this process, the metal-containing coating in the edge region is dissolved by the ceramic ink. The ceramic ink migrates into the underlying metal-containing coating. The ink is fired and bonds with the underlying glass surface. Thus, the problem of incorrect alignment of the print in the edge region can be avoided. Since the metal-containing coating can be overprinted in the edge region, no gap develops between the print and the metal-containing coating in the end product (cf. FIG. 4a). The error depicted in FIG. 4b does not occur since the underlying metal-containing coating is dissolved by the ceramic ink. Compared to large-area printing in the entire first region without prior removal of the metal-containing coating, this method provides better results. The quality of the printing in the completely de-coated region is better than in the region with the metal-containing coating. Consequently, with overprinting of the metal-containing coating only in the edge region, the method according to the invention provides surprisingly good results.

In step e), the glass panel is subjected to a temperature treatment at >600° C. Here, the temporary polymeric protective layer is removed on the entire first surface, and the ceramic ink is fired in the first region. Thanks to the method according to the invention, a toughened glass panel having a metal-containing coating and an imprint in a limited first region is thus obtained.

The method does not require separate steps for the large-surface removal of the polymeric protective layer. The polymeric protective layer decomposes at the high temperatures without residue such that no separate waste has to be disposed of. At the same time, the metal-containing coating is protected by the temporary polymeric protective layer during the printing process.

The fact that the polymeric protective layer is present at the beginning of the temperature treatment has a surprisingly positive effect. During the temperature treatment, the printed region and the region coated with the metal-containing coating heat up with different intensities. A body heats up depending on its emissivity ($\varepsilon$=emissivity). The emissivity of a body indicates how much radiation it emits compared to an ideal heat radiator, i.e., a black body. The emissivity of the ideal black body is 100%.

The region of the glass panel that is printed ($\varepsilon$ typically between 70% and 99%), heats up the most (in particular with a black print). The metal-containing coating alone has a very low emissivity ($\varepsilon$ typically between 0.5% and 4%), since it reflects heat and thus heats up very little. Without a polymeric protective layer, there would thus be a large temperature difference between a printed region and the region with a metal-containing coating. This results in optical defects in the end product, such as wave formation in the finished product.

Thanks to the polymeric protective layer ($\varepsilon$ of a glass panel with a metal-containing coating and polymer protective layer is typically greater than 40%), the temperature difference between a printed and a coated region is less. Thus, the heating of the entire glass panel is more uniform than without the polymeric protective layer. In particular, the difference during heating between the printed region without the metal-containing coating and the region with the metal-containing coating is thus reduced. Due to the more uniform temperature distribution over the glass surface during the temperature treatment, the end product has fewer optical defects/irregularities. In addition, compared to a method without the polymeric protective layer, heating times are significantly reduced.

The method according to the invention thus provides a glass panel, which includes at least one metal-containing coating that is protected by a polymeric protective layer during the printing operation all the way to the temperature treatment. The individual steps of the method can take place at different production sites. For example, steps a) to c) can be carried out at the glass manufacturer; step d) at the printer, and step e) at the glass manufacturer again. Thanks to the polymeric protective layer, the metal-containing coating remains protected against damage and corrosion all the way to the temperature treatment. The method thus offers great flexibility.

Previously, according to the prior art, the polymeric protective layer could only be combined with a print when an abrasive had been used for de-coating, with inevitable creation of small scratches in the first region. The panel produced in accordance with the method according to the invention has, in contrast, no scratches since the laser causes no disturbing damage during de-coating.

In a preferred embodiment of the method according to the invention, in step d), a safety distance from the polymeric protective layer is left free when the ceramic ink is applied. It can thus be ensured that no overprinting of the polymeric protective layer occurs. Printing on the polymeric protective layer leads to smearing of the ink after the temperature treatment, resulting in unclean edges of the printing. To avoid this, the ceramic ink is applied at a distance s of at least 0.5 mm, preferably 1 mm, from the remaining polymeric protective layer. This distance is sufficient to ensure that partial overprinting does not occur.

The glass substrate is preferably a clear or colored float glass. The thickness of the glass substrate is between 2 mm and 20 mm, preferably between 4 mm and 10 mm. Customary thicknesses are 2 mm, 3 mm, 4 mm, 5 mm, 6 mm, 8 mm, 10 mm, 12 mm, 15 mm, and 19 mm.

The glass substrate has a first surface and an opposite second surface. Preferably, only the first surface was provided with a metal-containing coating.

Alternatively, the first surface and the second surface were preferably provided with a metal-containing coating. In this case, both surfaces were preferably provided with a polymeric protective layer.

The glass panel is intended in particular as a window pane for building glazing.

The metal-containing coating is, in the context of the present invention, a coating that includes at least one functional layer containing a metal compound. The metal-containing coating is preferably a heatable coating or an IR-reflecting coating. The metal-containing coating can be a single functional layer, but is typically a multilayer system. The coating includes at least one functional layer. Typically, the metal-containing coating includes dielectric layers and other layers, which, as anti-reflection layers, blocking layers, or surface adaptation layers, optimize the optical, electrical, and/or mechanical properties of the metal-containing coating. The at least one functional layer can contain a metal or a metal alloy or an oxide. In a preferred embodiment, the at least one functional layer contains silver. The silver content of the functional layer is preferably greater than 50% (weight percent), particularly preferably greater than 90% (weight percent). Most particularly preferably, the functional layer consists substantially of silver, apart from any impurities or doping. The metal-containing coating can preferably contain a plurality of functional layers that are separated from one another by dielectric layers. The metal-containing coating preferably contains at least two, particularly preferably two or three, functional layers, in particular silver-containing layers. Typical materials common for the dielectric layers of the metal-containing coating are, for example, silicon nitride, silicon oxide, zinc oxide, tin zinc oxide, and aluminum nitride. The metal-containing coating is typically a thin-film stack. Typical thicknesses of the coating are less than 1 μm. Typical thicknesses of the functional layers are in the range from 5 nm to 50 nm for silver-containing layers. Suitable multilayer systems are described, for example, in US2011027554A1 and in US20060257670A1. Suitable coated glass substrates are marketed by SAINT GOBAIN GLASS under the name COOL-LITE®, in particular COOL-LITE® SKN and COOL LITE® XTREME.

The metal-containing coating can be applied by the known methods, such as magnetron sputtering, chemical vapor deposition (CVD), plasma-enhanced CVD (PECVD), pyrolysis, sol-gel methods, or wet chemical methods. Preferably, the metal-containing coating is deposited by magnetron sputtering.

The polymeric protective layer in the context of the invention preferably has a thickness of at least 1 μm, is not water-soluble, and is produced from a composition that contains meth(acrylates). "Not water-soluble" mean that the protective layer also withstands a customary washing operation of the panel. The polymeric protective layer is a temporary polymeric protective layer. The term "temporary" indicates that the protective layer is applied only for protection during storage or transport of the glass panel. Suitable protective layers are described in US2016194516A1. The polymeric protective layer in the context of the invention is not peelable, but, instead, is removed by thermal decomposition.

The first region is the region that is intended for printing with a ceramic ink. The first region is a flat region on the surface of the glass substrate. The size, outer shape, and the position of the first region can be freely selected.

The ceramic ink, also called "enamel", is melted onto the glass during the toughening process and forms a firm bond with the glass matrix. Usually, a ceramic ink contains as components glass formers (silicon dioxide ($SiO_2$) and/or boron trioxide ($B_2O_3$)), fluxes, which influence melting (e.g., $Na_2O$, $K_2O$, $Li_2O$, CaO, MgO, SrO, BaO), and other oxides such as aluminum oxide, zinc oxide, zirconium oxide. In addition, inorganic color pigments are used for coloring. The components can be suspended in a medium to enable the printing operation. Considered here are organic and/or aqueous solutions. The ceramic ink for the method according to the invention additionally includes components that enable the dissolving of the metal-containing coating in step e) of the method according to the invention. A chemical process during the temperature treatment can cause particles contained in the ink to be able to migrate into the underlying coating. As a result, the metal-containing coating is dissolved or removed, whereby bubble or gas formation can be observed. The particles mentioned can contain fluorine-based and/or bismuth based particles. US2011/0233481 discloses a fluorinated silver paste for forming electrical connections in dielectric layers by eating through the layers, so to speak. The ceramic ink can be applied by screen printing, rolling (also called roller coating), or digital printing. Preferably used are opaque ceramic inks.

In another preferred embodiment of the method according to the invention, the polymeric protective layer is not water-soluble and is produced from a composition that contains meth(acrylates). Thus, the protective layer protects particularly well against wetness and remains intact even during the customary washing operations. The polymeric protective layer is cured or cross-linked by drying, by IR or UV radiation, or by electron beam cross-linking.

The term meth(acrylates) refers to esters of acrylic acid or methacrylic acid containing at least one acryloyl ($CH_2$=CH—CO—) or methacryloyl ($CH_2$=CH($CH_3$)—CO—) function. These esters can be monomers, oligomers, pre-polymers, or polymers. When these meth(acrylates) are reacted under polymerization conditions, a polymer network with a solid structure is obtained.

Preferably, the polymeric protective layer has a thickness d of 1 μm to 30 μm, preferably 15 μm to 20 μm. With these thicknesses, sufficient scratch resistance is obtained to protect the underlying layer during storage and transport. The thickness d of the polymeric protective layer refers to the thickness of the polymeric protective layer at the beginning of the method.

Preferably, the thickness of the polymeric protective layer in the edge region $d_{Rand}$ is reduced in step b) to such an extent that after step b), it is less than 1 μm, preferably less than 0.5 μm. With these small residual thicknesses, the ceramic ink placed above them in step d) can be successfully fired in step e). The printed image thus obtained is surprisingly very good. It is easier to remove the polymeric protective layer down to a low residual thickness than to optimize the parameters for complete removal if a satisfactory result is obtained with both procedures.

In a preferred embodiment of the method according to the invention, the glass panel is thermally toughened in the further-above-described temperature treatment, wherein, in particular, single-pane safety glass (ESG) or partially toughened glass (TVG) is obtained. Therein, after heating the glass panel to temperatures above 600° C., preferably 620° C. to 700° C., the glass panel is rapidly cooled starting from the surfaces. Usually, the cooling is done by blowing with air. This creates permanent tensile stress in the interior of the glass panel and permanent compressive stress on the surfaces and at the edges. Consequently, thermally toughened glass has a higher mechanical destruction threshold than non-toughened float glass. Single-pane safety glass should generally have a degree of tempering at the surface of at least 69 MPa. In the case of partially toughened glass, surface compressive stresses of 24-52 MPa are achieved.

In another preferred embodiment of the method according to the invention, the ceramic ink is applied with a roll coater or a digital printer. The application by rolling with a roll coater is particularly advantageous in connection with flat edge printing. The ink is applied to the glass panel with a fluted rubber roller. On close observation, the fluted structure of the roller is visible on the side of the ink application. In the case of digital printing, the ceramic ink is applied to the glass surface in the manner of an inkjet printer. This method is particularly suitable for complex or multicolored designs or images.

In another preferred embodiment of the method according to the invention, the first region is subjected to plasma cleaning before the application of the ceramic ink. This removes any contaminants possibly adhering to the surface. At the same time, the surface is optimally prepared for the subsequent application of ink. Preferred is cleaning with atmospheric plasma, which enables immediate further processing of the glass. The product obtained with this method has an even better print and is, in particular, advantageous in combination with more complex imprints, which are generated, for example, by a digital printer. Since the thickness of the ink film created by a digital printer is thinner than the ink film produced by a roll coater, a particularly clean surface is advantageous.

Alternatively, or in addition to plasma cleaning, the entire panel can be washed and dried before printing. Customary aqueous washing solutions or pure water can be used.

In a preferred embodiment of the method according to the invention, the unprinted region with the metal-containing coating and the polymeric protective layer has emissivity c (epsilon) of more than 40%, preferably more than 45%. At these values, the difference from the printed region, which typically has an emission greater than 70% is not so large. This yields very good results after the temperature treatment. Fewer warps/ripples occur than with lower emissivity values.

In another preferred embodiment of the method according to the invention, the edge region has a width r of 0.1 mm to 10 mm, preferably of 0.5 mm to 5 mm. With this width of the edge region, the result after overprinting is particularly good. With edge regions that are wider than 10 mm, poorer results are obtained since the dissolving of the underlying metal-containing coating with large surface areas does not yield optimal results. Particularly preferably, the edge region has a width r of 1 mm to 2 mm. This small region is already sufficient to compensate for the tolerances arising with the alignment of the printing. The printing result with these low widths is excellent.

In another preferred embodiment of the method according to the invention, the application of the ceramic ink is done under camera control in the first region, with the camera detecting a difference between the de-coated first region and the region provided with the polymeric protective layer. As result of aligning the printer using a camera, the number of defects during printing can be further reduced. In particular, this prevents the occurrence of unprinted or overprinted regions that disrupt the optical appearance (cf. FIG. 4).

In another preferred embodiment of the method according to the invention, the glass panel is between 1 m$^2$ and 54 m$^2$ in size. The method according to the invention is particularly advantageous for large glass panels because, due to the presence of the polymeric protective layer during the toughening process, uniform heating of the glass panel occurs and heating times can be reduced. Preferably, the glass panel is between 3 m$^2$ and 40 m$^2$ in size. Particularly preferably, the glass panel has a size between 10 m$^2$ and 30 m$^2$.

In another preferred embodiment of the method according to the invention, the first region extends along at least one edge of the glass panel and has, measured from the panel edge, a width b between 0.5 cm and 30 cm, preferably between 1 cm and 20 cm, particularly preferably between 2 cm and 10 cm. Preferably, the printing is carried out along all edges of the panel. With a rectangular panel, this results in frame-like printing of the panel with a masking print at the edge of the panel. This frame-like printing is usually used to cover fastening means of the panel. The frame preferably has the same width along all panel edges. Particularly in connection with frame-like printing, the method according to the invention is advantageous since, due to the temperature differences in step e) without the polymeric protective layer, warps/ripples appear in the glass. This is caused by the temperature difference between the inner region and the surrounding printed region.

In another preferred embodiment of the method according to the invention, the metal-containing coating has an IR-reflecting function and contains at least two silver-containing layers and at least three dielectric layers. The silver-containing layers are made of silver or a silver compound. IR-reflecting means that, in particular, the part of the solar spectrum in the nonvisible range between 780 nm and 2500 nm is largely reflected. Thus, in the case of building glazing or vehicle glazing, heating of the interior is effectively avoided. Preferably, the at least two silver-containing layers and the at least three dielectric layers are arranged such that each silver-containing layer is surrounded by two dielectric layers, i.e., the layers are alternatingly arranged.

In a preferred embodiment of the method according to the invention, the particles created in steps b) and c) during laser de-coating are extracted with a suction device.

Preferably, the laser processing in steps b) and c) takes place under atmospheric conditions. Exclusion of oxygen is surprisingly not necessary. Due to the presence of the polymeric protective layer, the metal-containing coating is surprisingly sufficiently protected against corrosion at the boundaries of the first region. Without the presence of the temporary polymeric protective layer, the metal-containing coating would be oxidized by the oxygen present and the high energy input from the laser. Thus, surprisingly, no separate chamber with a protective gas atmosphere is necessary.

The lasering is done by at least one 2D laser scanner. These laser scanners are arranged perpendicular to the surface of the coated glass substrate. The 2D laser scanner has a maximum working area with a width of 3 m and a length of 18 m. The 2D laser scanner can be mounted on an axis such that it can be moved accordingly within the entire working area.

When using a 2D laser scanner, the laser beam generated by the laser source strikes a beam expander and is deflected from there to the 2D laser scanner by a mirror.

A carbon dioxide laser is used as the laser source for step b). The carbon dioxide laser has a wavelength of 10600 nm and is particularly economical. Consequently, it is worthwhile to first use the carbon dioxide laser to selectively remove the polymeric protective layer.

Pulsed solid state lasers or fiber lasers are preferably used as the laser source for step c). Particularly preferably used is a neodymium-doped yttrium-aluminum-garnet laser (Nd:YAG laser). Alternatively, ytterbium (Yb:YAG-laser) or erbium (Er:YAG-laser) can be used as doping materials or titanium:sapphire laser or neodymium-doped yttrium-vanadate-laser (Nd:YV04-laser) can be used. The Nd:YAG-laser emits infrared radiation with a wavelength of 1064 nm. However, by frequency doubling or frequency tripling, even radiation of wavelengths 532 nm and 355 nm can be produced.

The lasering is done with a wavelength of 300 nm to 1300 nm. The wavelength used depends on the type of coating. The Nd:YAG-laser preferably used can provide laser radiation of the wavelengths 355 nm, 532 nm, and 1064 nm. A wavelength of 532 nm is preferably used for processing silver coatings.

The lasering is preferably done with a power of 1 W to 150 W, particularly preferably with a power of 10 W to 100 W.

A further aspect of the present invention is the glass panel produced with the method according to the invention.

A further aspect of the present invention is the use of the glass panel produced with the method according to the invention as building glazing indoors or outdoors, preferably as part of an insulating glazing.

BRIEF DESCRIPTION OF THE DRAWINGS

In the following, the invention is explained in detail with reference to drawings and exemplary embodiments. The drawings are schematic representations and not to scale. The drawings in no way restrict the invention.

They depict:

FIG. 1 depicts a plan view of a glass panel 1 produced with the method according to the invention.

FIG. 5b) depicts this schematically for the same detail as in FIG. 5a). In the last step e), the panel 1 is subjected to a temperature treatment at 690° C. for 8 minutes. Here, simultaneously, the panel is toughened, the polymeric protective layer 5 is removed without residue, and the ceramic ink 7 dissolves the remaining metal-containing ink in the edge region and bonds with the glass surface.

FIG. 4 depicts two error patterns that can develop as a result of incorrect alignment of the print when the method according to the invention is not used. In Fig. a), the print is not positioned exactly adjacent the metal-containing coating such that a bright line develops along the print that disrupts the optical appearance of the product. In Fig. b), the print is positioned partially overlapping the metal-containing coating 4, likewise resulting in optical defects. As a result of the partial overprinting of the metal-containing coating 4 in the edge region 10, such error patterns can be prevented with the method according to the invention.

Figure 1:
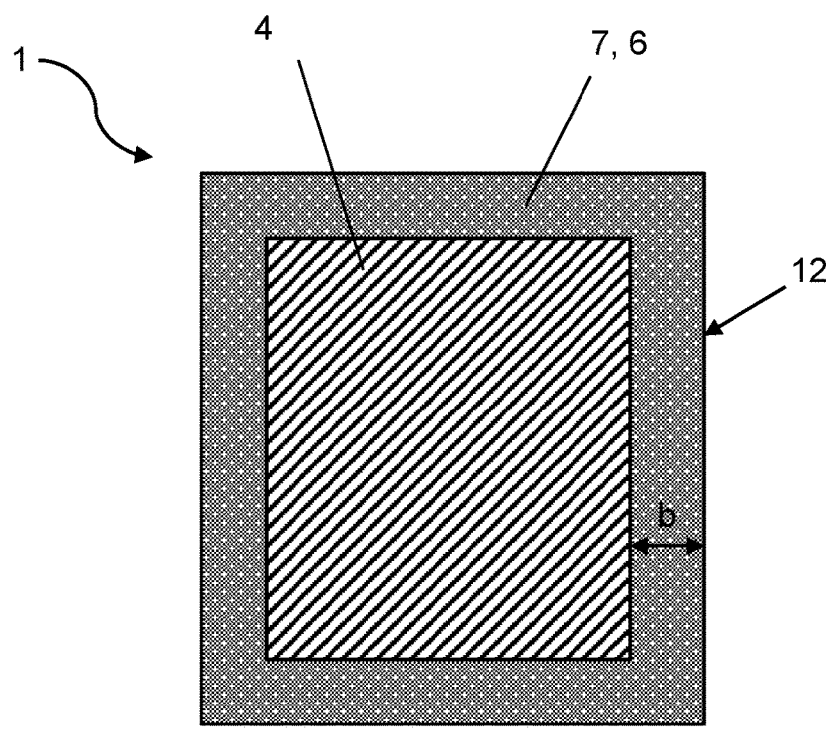
FIG. 1 a plan view of a glass panel produced in accordance with a method according to the invention, FIG. 2 a cross-section through a part of a glass panel produced in accordance with the method according to the invention, FIG. 3 a schematic representation of a method according to the invention, FIG. 4 a schematic representation of errors that can occur during the printing of glass panels, and FIG. 5 an enlarged representation of the region A of FIG. 3.
Figure 2:
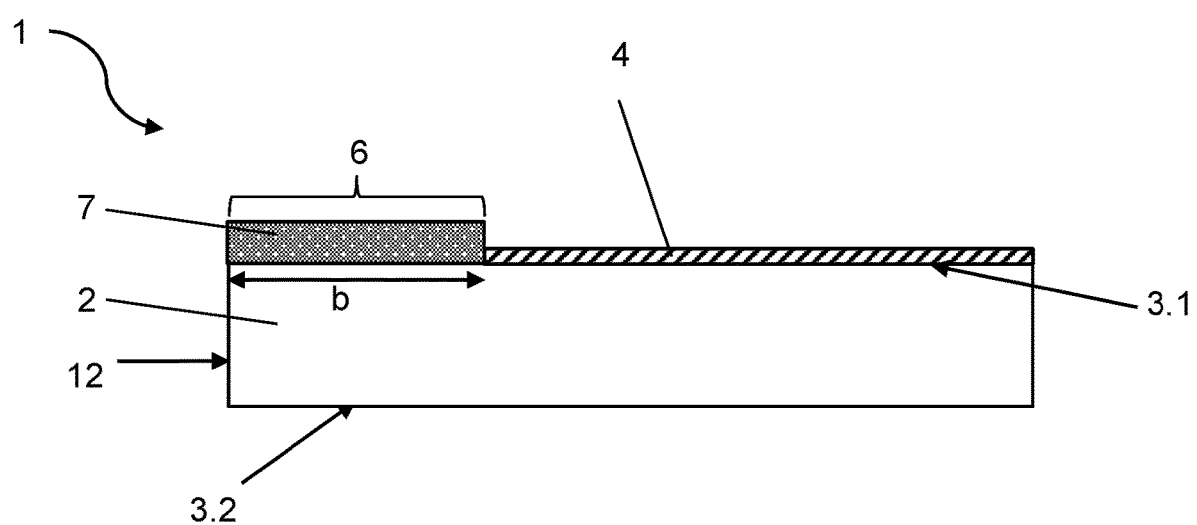
FIG. 2 depicts a cross-section through a region of the glass panel 1. The glass panel 1 is depicted after the temperature treatment of the method according to the invention. The glass panel 1 is a 2 m×1 m glass panel with a thickness of 6 mm. The glass substrate 2 is a clear float glass, as is marketed, for example, by SAINT GOBAIN GLASS under the name PLANI-CLEAR®. A silver-containing IR-reflecting coating 4 is applied on the first surface 3.1 of the glass substrate. The coating 4 contains two functional silver layers that are arranged alternatingly with 3 dielectric layers. The total thickness of the metal-containing coating 4 is approx. 150 nm. A black ceramic ink 7 is fired in the first region. The first region 6 forms a frame around the glass panel 1 with a width b of 10 mm. The frame serves as a masking print behind which the fastening materials and the edge seal of the finished insulating glazing panel are hidden.
Figure 3:
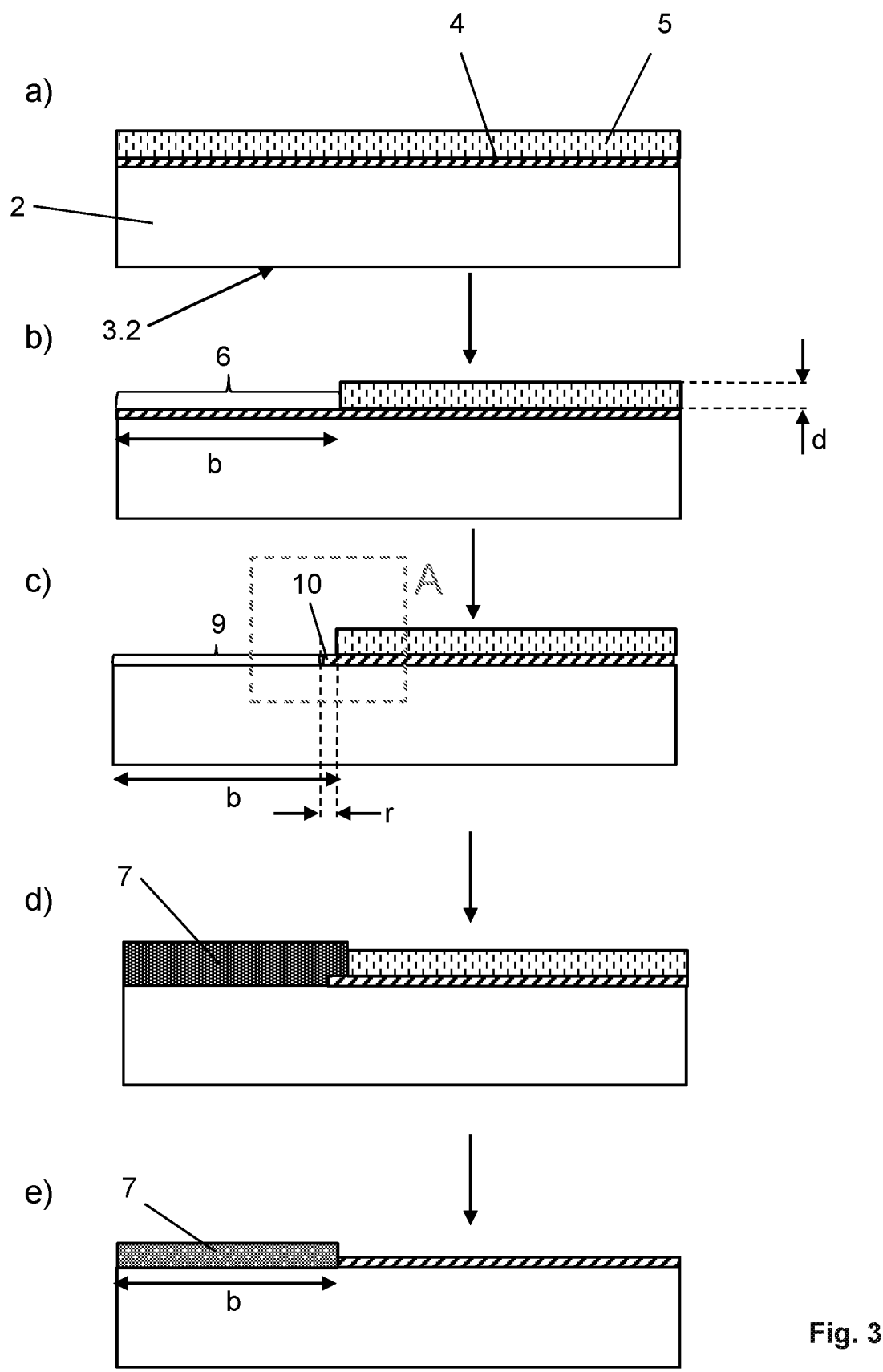
FIG. 3 is a schematic representation of the method according to the invention. Step a) starts with a 6-mm-thick glass substrate 2 with a metal-containing coating 4 with a total thickness of 200-250 nm at least comprising three silver layers and four dielectric layers. The metal-containing coating 4 is covered by a 15-μm-thick polymeric protective layer 5. The polymeric protective layer 5 is produced from a composition that contains meth(acrylates) and was cross-linked under UV radiation. The polymeric protective layer 5 has a thickness d of 15 μm. A suitable polymeric protective layer 5 is offered by SAINT GOBAIN GLASS under the name EASYPRO®. The first surface 3.1 of the glass substrate 2 is provided over its entire surface with the layers 4 and 5. In step b), using a 2D laser scanner with a carbon dioxide laser, the polymeric protective layer 5 is removed in the first region 6 with the width b=20 mm to a remaining residual thickness of $d_{Rand}$=0.5 μm. The region A surrounded by a broken line is enlarged for illustration in FIG. 5a. In step c), the second region 9 is de-coated with a 2D laser scanner with a solid-state laser. The metal-containing coating 4 and the residual thickness of 1 μm are removed in the entire second region 9. For this, the solid-state laser de-coats a smaller second region 9, which lies within the first region 6. The steps b) and c) take place under ambient conditions without exclusion of oxygen. After step c), the metal-containing coating and the polymeric protective layer are removed in the entire second region 9. In the edge region 10 with the width r=1 mm, the metal-containing coating 4 is still present as well as a remaining residue of the polymeric protective layer of the thickness $d_{Rand}$ of 0.5 μm. In the following step d), a black ceramic ink 7 is applied in the first region 6. Here, it is important for an optimum result that no overprinting of the polymeric protective layer 5 in the original thickness d=15 μm occurs. To ensure this, a safety distance s of 0.5 mm is left free.

In the following, the advantages of the method according to the invention (Example) are explained in comparison with a prior art method (Comparative Example).

In both cases, a 1 m×2 m glass substrate of clear float glass was produced with the same silver-containing coating comprising 3 functional silver layers. A black edge printing in the shape of a frame was applied with different widths b. After printing, the panels were toughened at a temperature of 690° C. for a period of 500 seconds. The thermal emissivity was determined using an INGLAS TIR100-2.

EXAMPLE

Glass panel: 1 m×2 m clear float gas
Metal-containing coating: contains 3 silver layers
Polymeric protective layer: 15 μm SGG EasyPro®; (meth) acrylate-based layer
Emissivity of the unprinted region (metal-containing coating and polymeric protective layer; measured before the temperature treatment): 45%
Emissivity of the printed region (measured after the temperature treatment): 89%

COMPARATIVE EXAMPLE

Glass panel: 2 m×1 m clear float glass
Metal-containing coating: contains 3 silver layers
Emissivity of the unprinted region (only metal-containing coating; measured before the temperature treatment): 2%
Emissivity of the printed region (measured after the temperature treatment): 89%

| | Deformation in mm measured at a distance of 5 mm from the edge of the glass panel | |
|---|---|---|
| Width b of the frame in mm | Example (with polymeric protective layer) | Comparative Example (without polymeric protective layer) |
| 24 | None | 0.10 |
| 96 | 0.05 | 0.15 |
| 192 | 0.10 | Glass breakage |

The deformation was measured as a change in thickness of the glass panel at a distance of 5 mm from the edge. The comparison shows that the method according to the invention results in substantially less or no deformation at all in the printed region. In the case of larger frame prints, there was even glass breakage without the use of a protective layer.

LIST OF REFERENCE CHARACTERS

1 glass panel
2 glass substrate
3.1 first surface of the glass substrate
3.2 second surface of the glass substrate
4 metal-containing coating
5 polymeric protective layer, temporary protective layer
6 first region, region to be printed, printed region
7 ceramic ink
9 second region
10 edge region
12 a panel edge
b width of the first region
d thickness of the polymeric protective layer at the beginning of the method
$d_{Rand}$ thickness of the polymeric protective layer in the edge region after step b)
r width of the edge region
s distance between the ceramic ink and the polymeric protective layer

The invention claimed is:

1. A method for producing a coated and printed glass panel, comprising the steps of:
a) providing a glass substrate having a metal-containing coating on at least one first surface and a polymeric protective layer with a thickness d arranged on said metal-containing coating, wherein the polymeric protective layer has a thickness d of 1 μm to 30 μm,
b) reducing the thickness of the polymeric protective layer to a residual thickness in a first region using a carbon dioxide laser,
c) removing the metal-containing coating only in a second region located within the first region using a solid-state laser such that an edge region within the first region is created in which the metal-containing coating is intact and in which the thickness of the polymeric protective layer was reduced to the residual thickness,
d) applying a ceramic ink only in the first region, and
e) performing a temperature treatment of the glass panel at >600° C., wherein
the polymeric protective layer is removed on the entire first surface, and the ceramic ink in the edge region migrates into the metal-containing coating and bonds with the first surface of the glass panel.

2. The method according to claim 1, wherein in step d), the ceramic ink is applied in the edge region at a distance s of at least 0.5 mm from the remaining polymeric protective layer.

3. The method according to claim 1, wherein the polymeric protective layer is not water-soluble and is produced from a composition that contains meth(acrylates).

4. The method according to claim 1, wherein the glass panel is thermally toughened during the temperature treatment.

5. The method according to claim 4, wherein the thermally toughened glass panel is a single-pane safety glass or a partially toughened glass.

6. The method according to claim 1, wherein the ceramic ink is applied with a roll coater or a digital printer.

7. The method according to claim 1, wherein the first region is subjected to plasma cleaning before the application of the ceramic ink.

8. The method according to claim 1, wherein the region with the metal-containing coating and the polymeric protective layer has emissivity c greater than 40%.

9. The method according to claim 8, wherein the emissivity ε is greater than 45%.

10. The method according to claim 1, wherein the application of the ceramic ink is done in the first region under camera control, wherein the camera detects a difference between the de-coated second region and the region provided with the polymeric protective layer of the thickness d.

11. The method according to claim 1, wherein the glass panel is between 1 m² and 54 m² in size.

12. The method according to claim 11, wherein the glass panel is between 10 m² and 30 m² in size.

13. The method according to claim 1, wherein the first region extends along at least one edge of the glass panel and, measured from the panel edge, has a width b between 0.5 cm and 30 cm.

14. The method according to claim 13, wherein the width b is between 1 cm and 20 cm.

15. The method according to claim 1, wherein the metal-containing coating has an IR-reflecting function and contains at least two silver-containing layers as well as at least three dielectric layers.

16. A method comprising utilizing the glass panel produced in a method according to claim 1 as building glazing indoors or outdoors.

17. The method according to claim 1, wherein the thickness d is from 15 μm to 20 μm.

18. The method according to claim 1, wherein after step b), the residual thickness of the polymeric protective layer in the edge region is less than 0.5 μm.

* * * * *